US005540840A

United States Patent [19]
Heitkamp et al.

[11] Patent Number: 5,540,840
[45] Date of Patent: Jul. 30, 1996

[54] USE OF FLUIDIZED BED REACTORS FOR TREATMENT OF WASTES CONTAINING ORGANIC NITROGEN COMPOUNDS

[75] Inventors: Michael A. Heitkamp, Ballwin; M. Joan Brackin, Maryland Heights; Daniel E. Steinmeyer, Chesterfield, all of Mo.

[73] Assignee: Monsanto Company, St. Louis, Mo.

[21] Appl. No.: 458,946

[22] Filed: Jun. 2, 1995

[51] Int. Cl.$^6$ .................................................. G02F 3/08
[52] U.S. Cl. ...................... 210/617; 210/621; 210/903; 210/904; 210/908
[58] Field of Search .................................... 210/603, 616, 210/617, 620, 621, 903, 904, 908

[56] References Cited

U.S. PATENT DOCUMENTS

| | | |
|---|---|---|
| 3,940,332 | 2/1976 | Kato et al. . |
| 4,009,098 | 2/1977 | Jeris .......................................... 210/617 |
| 4,009,099 | 2/1977 | Jeris .......................................... 210/151 |
| 4,009,105 | 2/1977 | Jeris .......................................... 210/151 |
| 4,059,492 | 11/1977 | Hansweiler et al. . |
| 4,182,675 | 1/1980 | Jeris .......................................... 210/617 |
| 4,239,620 | 12/1980 | Doll et al. ................................. 210/904 |
| 4,560,479 | 12/1985 | Heijnen ..................................... 210/617 |
| 4,623,464 | 11/1986 | Ying et al. ................................ 210/616 |
| 4,655,924 | 4/1987 | Heijnen ..................................... 210/617 |
| 4,919,815 | 4/1990 | Copu et al. ................................ 210/616 |
| 5,334,313 | 8/1994 | Anderson .................................. 210/904 |
| 5,439,590 | 8/1995 | Steffan ...................................... 210/616 |

FOREIGN PATENT DOCUMENTS

| | | |
|---|---|---|
| 0274856 | 7/1988 | European Pat. Off. . |
| 2358362 | 3/1978 | France . |
| 51148970 | 12/1976 | Japan . |
| 53041054 | 4/1978 | Japan . |
| 54021052 | 2/1979 | Japan . |
| 54027256 | 3/1979 | Japan . |
| 63007897 | 1/1988 | Japan . |
| 2160097 | 6/1990 | Japan . |
| 90027033 | 6/1990 | Japan . |
| 4176388 | 6/1992 | Japan . |
| 663782 | 1/1988 | Switzerland . |

OTHER PUBLICATIONS

*Laboratory–scale evaluation of aerobic fluidized bed reactors for the biotreatment of a synthetic, high–strength chemical industry waste stream* by Daniel E. Edwards, William J. Adams and Michael A. Heitkamp, *Water Environment Research*, Jan./Feb. 1994, vol. 66 No. 1.
*Biological Treatment of Wastewater From Byproduct Coking Operations: An Innovative Approach*, by Paul M. Sutton, Igor J. Marvan and Fraser Craig, *45th Purdue Industrial Waste Conference Proccedings*, 1991 Lewis Publishers, Inc.
*Chem. Abstr.* 105(16):139072e Water Purification by Fluidized Bed Technique by Ademoroti, 1986.
*Chem. Abstr.* 93(8):79154e Bacterial Growth in Fluidized Beds of Activated Carbon by Andrews, 1979.
*Chem. Abstr.* 110(14):120882a Designing Fixed–bed Adsorbers to Remove Mixtures of Organics by Hand, Crittenden, Arora, Miller and Lynkins, 1989.

(List continued on next page.)

Primary Examiner—Christopher Upton
Attorney, Agent, or Firm—Kenneth D. Goetz

[57] ABSTRACT

A method for treatment of a liquid waste stream having an undesirably high COD and comprising water and a concentration of organic nitrogen compounds of at least about 300 mg/l total kjedahl nitrogen is disclosed. According to the method, the liquid waste stream is oxygenated to produce an oxygenated liquid containing water, dissolved oxygen and the organic nitrogen compounds and the oxygenated liquid is passed through a fluidized bed reactor containing a fluidized bed of particulate solids supporting microorganisms capable of biodegrading the organic nitrogen compounds, thereby to subject the organic nitrogen compounds in the oxygenated liquid to aerobic microbial degradation and to produce an effluent containing water, ammonia and carbon dioxide, and the fluidized bed reactor contents and the effluent is maintained at a pH in the range of from about 6 to about 8.

39 Claims, 2 Drawing Sheets

OTHER PUBLICATIONS

*Chem. Abstr.* 81(24):158260s High Rate Biologoical Denitrification Using a Granular Fluidized Bed by Jeris, Beer and Mueller, 1974.

*Chem. Abstr.* 113(12:102728n Support Media for Microbial Adhesion in an Anaerobic Fluidized–Bed Reactor by Kida, Morimura, Sonoda, Obe and Kondo, 1990.

*Chem. Abstr.* 110(8):63049h Addition of Powdered Activated Carbon into a Biological, Fluidized–Bed Reactor Containing an Adsorptive or a Nonadsorptive Medium, 1988.

*Chem. Abstr.* 113(14):120228d Nitrogen Removal from Coal Gasification Wastewater by Biological Treatment by Lu, Chian and Gross, 1989.

*Chem. Abstr.* 114(16):149831b Large–Scale Biological Nitrate and Ammonia Removal by Rogalla, Ravarini, De Larminat and Couttelle, 1990.

*Chem. Abstr.* 116(10):90520k Advanced Wastewater Treatment in Petrochemical Plants Using Multistage Process Technology with Equalization Tank, Chemical Precipitation, Fixed Bed Biology, Sand Filtration, and Activated Carbon by Sekoulov, Toews, Schroeder, Goerg, and Holst, 1991.

*Chem. Abstr.* 96(20:168003j Microbial Film Model for the Interaction Between Adsorption and Bacterial Activity in Fixed Bed Processes by Tien, 1981.

*Chem. Abstr.* 114(8):68408s Simultaneous Modeling of Competitive Adsorption and Dual Substrate Biodegradation in Completely Mixed GAC Reactors by Traegner, 1990.

*Chem. Abstr.* 86(4):21393w Nitrification of Ammonia by Microorganisms in an Activated Carbon Fluidized Bed by Tsunoda, Shimada and Aoyanagi, 1976.

5,540,840

USE OF FLUIDIZED BED REACTORS FOR TREATMENT OF WASTES CONTAINING ORGANIC NITROGEN COMPOUNDS

BACKGROUND OF THE INVENTION

1. Field of the Invention

The present invention relates to treatment of waste streams containing organic nitrogen compounds, and more particularly to ammonification of such streams by microbial degradation in a fluidized bed reactor.

2. Description of the Prior Art

Increasingly stringent goals for minimizing waste have necessitated the search for new technologies for waste reduction. With respect to streams of unacceptably high levels of organic nitrogen compounds, this need has been particularly notable with respect to streams that contain organic nitrogen compounds such as nitriles, especially dinitriles.

Nitriles, including mono-nitriles and dinitriles, are recognized as troublesome contaminants of waste water streams. Dinitriles, such as fumaronitrile and succinonitrile, are especially notorious for their acute toxicity and resistance to degradation. Note, for example, European patent application no. 87310689.2, publication no. 0 274 856, of Knowles. Moreover, degradation of dinitriles produces twice as much ammonia as does degradation of nitriles. The ammonia production has been viewed as a serious problem due to its toxicity and effects on pH.

Organic nitrogen compounds are found in many types of waste streams, often as by products in synthesis of organic compounds. For example, acrylonitrile (AN) is produced by an ammoxidation process in which propylene and ammonia are catalytically combined. During this process, by-products such as succinonitrile, fumaronitrile and maleonitrile are formed and end up in the stripper bottoms and so in the waste water along with some of the acrylonitrile. In addition, the waste water contains ammonium salts and organic acids as well. For example, a typical waste water stream from acrylonitrile production may include hydrogen cyanide, acetonitrile, acrolein, acrylonitrile, oxazole, propionitrile, methacrylonitrile, acetic acid, c-crotononitrile, allyl cyanide, t-crotononitrile, acrylic acid, cyanobutene, cyanobutadiene, pyrazine, cyanobutadiene, maleonitrile, fumaronitrile, cyanofuran, cyanopentadiene, cyclopentadiene, cyanopropanal, acrylamide, succinonitrile, maleimide, benzonitrile, cyanopyridine, methylbenzonitrile and cyanopentene, among others. Similarly, waste water containing organic nitrogen compounds is produced during the production of other nitrogen-containing compounds.

Various techniques have been employed for reduction of organic nitrogen compounds in waste streams by degrading such compounds to environmentally acceptable lower compounds, ultimately carbon dioxide and ammonia. For example, biological degradation processes (see, for instance, the European patent application of Knowles noted above), activated sludge systems (see, for instance, U.S. Pat. No. 3,940,332 to Kato et al.) and deep-well injection methods have been used. However, such techniques have several significant drawbacks. The presence of nitriles in the waste has been found to exert a strong inhibitory effect on activated sludge systems. In addition, production of ammonia in the aqueous streams not only results in toxicity (and can kill the microorganisms required for effecting degradation) but also raises the pH of the effluent to unacceptable levels, requiring the addition of acids or buffers. Generally, ammonia levels of about 300 mg/l or more, especially about 500 mg/l or more, are troublesome unless the medium is buffered.

Moreover, such techniques are not as effective as desired. For example, the noted references report efficacy (that is, reduction of chemical oxygen demand (COD)) in the range of only about 71% (Kato) to about 7% (Knowles) for treatment of acrylonitrile bottoms, and even then such efficacy is reported only for low organic nitrogen content streams. For example, Knowles describes an AN stripper column bottoms waste having a TKN of only 180 mg/l Knowles reports high efficiency ratings only for streams of relatively low levels of organic nitrogen compounds. Thus, techniques for more effective degradation are desired, especially for streams of TKN above 300 mg/l especially above about 500 mg/l Fluidized bed reactors (FBRs) utilizing immobilized bacteria technology (IBT) contain a fluidized bed of particulate solids as a biocarrier supporting microorganisms capable of biodegrading certain compositions. FBRs achieve expansion of the biocarrier bed by recycling the waste water being treated upward through the reactor. Use of FBRs employing IBT has been reported in certain waste water treatment processes. For example, U.S. Pat. No. 4,009,099 to Jeris describes a method for treating waste water with an FBR using IBT. However, that patent describes the use of an FBR for converting ammonia nitrogen in waste water to an oxidized form. The patent is not directed to degradation of organic nitrogen compounds to ammonia, but to nitrification of ammonia to $NO_3$, which would then require denitrification. Thus, it is not applicable to treatment of nitrile streams.

A recent article in *Water Environment Research*, Vol. 66, pp. 70–83 (January/February 1994), entitled, "Laboratory-Scale Evaluation of Aerobic Fluidized Bed Reactors for the Biotreatment of a Synthetic, High-Strength Chemical Industry Waste Stream," describes the use of an FBR to treat waste streams. However, this article by D. E. Edwards, W. J. Adams and M. A. Heitkamp (a co-inventor of the present method), is directed to treatment of very low organic nitrogen content streams and contains no indication that such method would prove effective in degrading significant amounts of organic nitrogen compounds.

An article of P. M. Sutton et al. published in the 45*th Purdue Industrial Waste Conference Proceedings*(1991 Lewis Publishers, Inc., Chelsea, Mich.), at pages 751–758, "Biological Treatment of Wastewater from Byproduct Coking Operations: An Innovative Approach", describes a treatment process that requires external pH control and recognizes that performance may be affected negatively by high levels of ammonia nitrogen in the feed. U.S. Pat. No. 4,059,492 to Hamweiler et al. discloses a process for purification of waste from acrylonitrile production. However, conventional techniques generally do not degrade the organic nitrogen compounds in the waste streams to the degree desired and often they require exogenous buffering such as by the addition of phosphoric acid because of the production of ammonia. This acidity may then make ammonia stripping downstream difficult and limit the ability to recycle or reuse water. Accordingly, expensive techniques to deal with the added acid or to remove the ammonia in the presence of the acid are employed.

Thus, conventional techniques involve long, complex development of specific consortia of bacteria or, as in Jeris, a long, slow nitrification and denitrification process. Such processes therefore tend to be complex, slow and expensive, and involve use of exogenous buffering with its attendant complications in later ammonia removal. Moreover, despite these accommodations, the processes still do not tend to degrade the contaminants to the degree desired.

Accordingly, industries that must deal with disposal of aqueous waste streams containing organic nitrogen compounds are still searching for improved methods of more effectively degrading the organic nitrogen compounds in the waste water (that is, that achieve a greater reduction in COD) and that are environmentally compatible.

SUMMARY OF THE INVENTION

Briefly, therefore, the present invention is directed to a novel method for treatment of a liquid waste stream containing water and a concentration of organic nitrogen compounds of at least about 300 TKN. The method comprises several steps. First, the liquid waste stream is oxygenated to produce an oxygenated liquid containing water and the organic nitrogen compounds. Next, the oxygenated liquid is passed through a fluidized bed reactor containing a fluidized bed of nitrile-absorbing particulate solids supporting microorganisms capable of biodegrading the organic nitrogen compounds, thereby to subject the organic nitrogen compounds in the oxygenated liquid to aerobic microbial degradation and to produce an effluent containing water, ammonia and carbon dioxide. The pH of the bioreactor and the effluent is maintained between about 6 and about 8.

Among the several advantages found to be achieved by the present invention, therefore, may be noted the provision of a method of improved efficacy for treating aqueous waste streams containing organic nitrogen compounds; the provision of such method that is environmentally compatible; the provision of such method that is less complex and less expensive than prior art methods; the provision of such method that effects extremely effective degradation of organic contaminants; the provision of such method that permits ammonia removal by stripping; the provision of such method that forms ammonium ions without the need for addition of acids or buffers; the provision of such method that facilitates ammonia recovery; and the provision of such method that facilitates the recycling or reuse of water.

DESCRIPTION OF THE PREFERRED EMBODIMENTS

Figure 1:
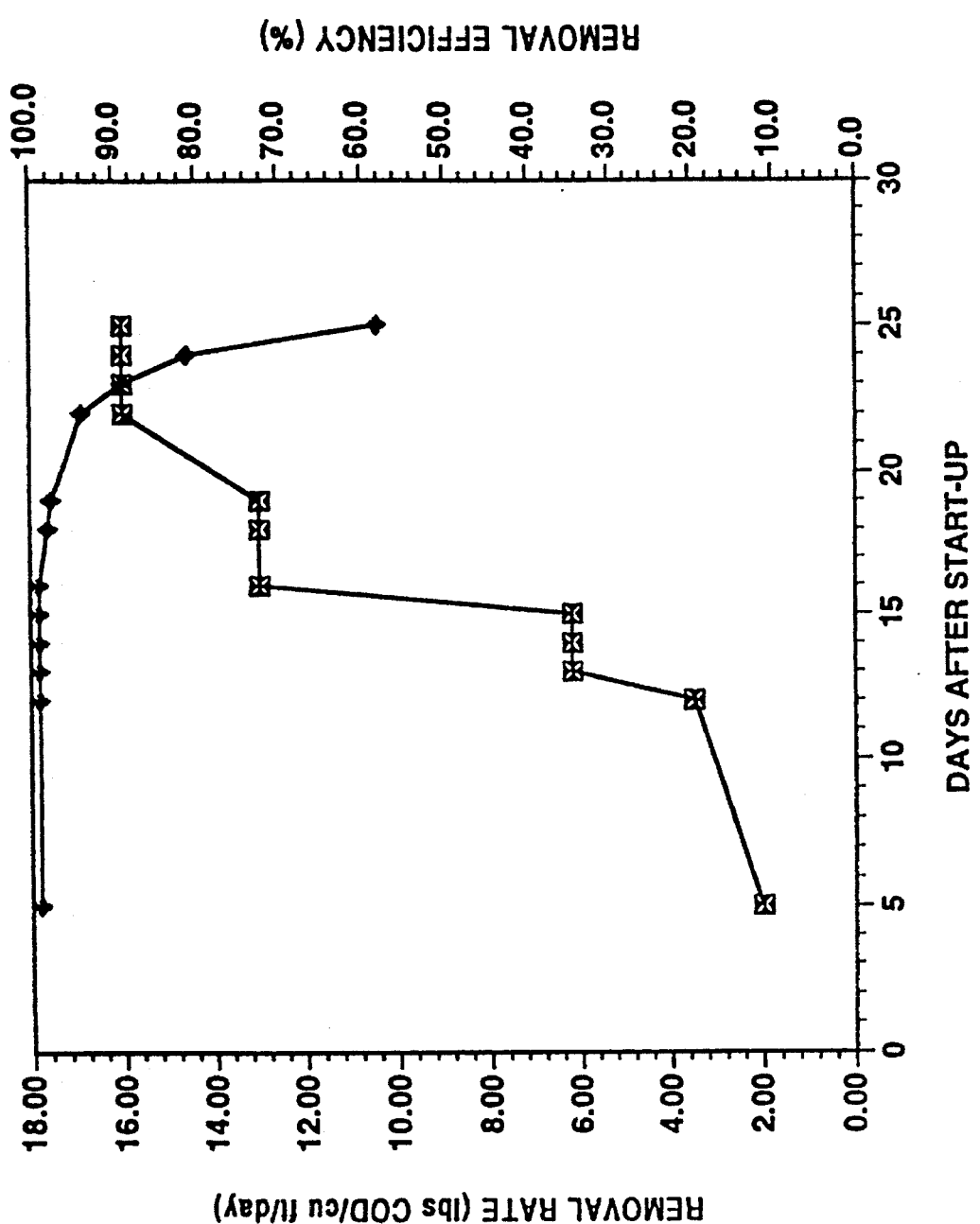
FIG. 1 is a graph of the chemical loading (represented by squares) and COD removal efficiency (represented by diamonds) for the fluidized bed reactor of Example 2.

In accordance with the present invention, it has been discovered that oxygenating an aqueous liquid waste stream containing at least about 300 TKN organic nitrogen compounds to produce an oxygenated stream and passing the oxygenated stream through a fluidized bed reactor (FBR) utilizing immobilized bacteria technology (IBT) on a nitrile-adsorbing particulate solid thereby to subject the organic nitrogen compounds to aerobic microbial degradation and to produce an effluent containing water, ammonia and carbon dioxide results in surprisingly effective degradation of the organic nitrogen compounds to carbon dioxide and ammonia. Thus, it has been found that the FBR described in *Water Environment Research* article, incorporated herein by reference, may be applied to high organic nitrogen content streams with surprisingly high efficacy. In fact, degradation in excess of 90% and even in excess of 98% at certain chemical loadings has been found. Moreover, not only is the method environmentally compatible, but it has been found that by dissolving oxygen in the stream by means external to the FBR bed before effecting degradation rather than aerating the reactor, the carbon dioxide produced in the method may be allowed to accumulate, thereby rendering the process self-buffering and maintaining the pH of the material during treatment in the FBR and of the effluent near neutral. This permits the development of a high concentration of ammonia nitrogen in the effluent water without formation of significant levels of free ammonium associated with the numerous problems mentioned above, including the killing of the microbes needed for the chemical degradation.

This method, therefore, has been found to be surprisingly less expensive and less complex, yet more effective than prior art processes. In fact, the degradation of high levels of organic compounds is so nearly complete that the resulting water may be recycled for use such as in cooling towers. Moreover, because the buffering may be accomplished with the produced carbon dioxide rather than by exogenous buffering by, for example, addition of phosphoric acid, the carbon dioxide may be easily removed, thereby raising the pH of the effluent and permitting ammonia removal by simple ammonia stripping. By contrast, prior art techniques that involve addition, for example, of phosphoric acid render such stripping more difficult or impossible and contaminate the effluent so that it is not suitable for recycle uses.

Thus, the method of this invention is directed to treatment of liquid aqueous waste streams that contain organic nitrogen compounds, such as liquid effluents from any of a variety of chemical syntheses as discussed, with an FBR. In particular, the present invention has been found to be extremely effective in treatment of mono-nitrile- or dinitrile-containing streams, and especially streams such as acrylonitrile stripper bottoms, or other purge water from acrylonitrile manufacturing plants, which contain the particularly toxic and degradation-resistant four-carbon dinitriles that produce high levels of nitrogen upon degradation. Such streams often contain more than about 50 ppm dinitriles based on weight.

The construction of FBRs is well known. The FBR comprises a fluidized bed in a main column. The fluidized bed in turn comprises a particulate solid. A variety of suitable particulate solids are known in the industry and exemplary of such solids are sand, activated coconut carbon (such as available from Charcoal Filtration Media of Inglewood, Calif.) and granulated activated carbon (GAC). The particulate solid for use in the present method should be one that adsorbs organic nitrogen compounds, especially nitriles (particularly mono-nitriles and dinitriles), thereby to mitigate their toxicity. GAC has been found to be especially suitable for the instant process because it is able to support large quantities of biomass and has been found to be a surprisingly effective adsorbent for nitriles and some other wastewater contaminants. This is believed to be due to its high surface area per unit weight (1000 $m^2$/gram) and the presence of activated chemical-binding sites. Thus, it provides chemical adsorption as a second mechanism of chemical removal from the liquid waste. As a result, the nitrogenous wastes are held in the reactor and the concentration of organic matter at the carbon-biomass interface is increased, stimulating microbial growth and chemical removal. Further, as noted the GAC adsorbs some toxic components, mitigating their toxic effects on the bacteria in the bioreactor and maintaining the biodegradation by bacteria at waste concentrations higher than those that can be treated with biotreatment systems. This advantage has been known for petroleum-type products such as toluene and the like. However, it now has been discovered that GAC is surprisingly effective in adsorbing toxic compositions such as nitriles and so its use results in substantial improvement in degradation efficacy and mitigation of toxicity. GAC also is beneficial for adsorbing surges in chemical loading which may occur in industrial applications. The surge loadings of chemicals are retained in the reactor until degraded by the microorganisms, resulting in more stable reactor performance and maintenance of a high quality effluent from the FBR.

The particulate solid is coated with microorganisms capable of biodegrading the organic nitrogen compounds of interest in the waste stream to be treated. Those of ordinary skill in the art would readily recognize the types of microorganisms that would be suitable. For example, the Knowles and Kato et al. references noted above are directed to microorganisms of this type. Generally, however, suitable materials for use as a particulate coating containing microorganisms may be obtained as mixed liquor suspended solids (MLSS) in activated sludge that is readily available from publicly operated treatment works that receive influent from sources other than residences (that is, that receive industrial wastes, especially a complex mix or variety of chemical wastes, as opposed to household wastes). A typical sludge of this type containing an uncharacterized consortium of bacteria was obtained from an activated sludge system from an AN producer and employed by the present inventors. Thus, whereas Knowles employed a highly defined consortium of microorganisms and Kato et al. used a specific type of microorganism, the present method is operable with a very generic, mixed microbial inoculum collected from industrial waste treatment systems.

The main column of the FBR is equipped with a recycle line which recirculates water from the top of the bioreactor into the bottom of the bioreactor. This recycle line is equipped with an oxygen input for oxygenation of the recycle stream. The main column, and therefore the fluidized bed, is not sparged with oxygen or any other gas. The only elemental oxygen injected into the fluidized bed is the oxygen (generally dissolved oxygen) that has been incorporated into in the recycle stream outside of the bed.

In the present method, the stream to be treated is generally an aqueous liquid containing organic nitrogen compounds, often toxic levels of organic nitrogen. Non-limiting examples of such liquids include purge water from acrylonitrile manufacturing plants, for instance, acrylonitrile stripper bottoms and derivatives of such stripper bottoms (i.e., acrylonitrile stripper bottoms that have undergone further treatment such as distillation or fractionation), and other nitrile-containing stream. As used herein, "toxic" levels means that the 48 hr $EC_{50}$ for *Ceriodaphnia dubia* is 50% or less. The stream may contain a variety of nitriles and other compounds, such as particularly troublesome $C_4$ dinitriles such as succinonitrile, fumaronitrile, acrylonitrile and maleonitrile, as well as propionitrile, 3-cyanopyridine, acetonitrile, methacrylonitrile, acrylonitrile, crotononitrile, allyl cyanide, cyclopentadiene, cyanopentadiene, cyanobutadiene, pyrazine, cyanopropanal, acylamide, maleimide, benzonitrile, acrylic acid, acetic acid, oxyazole, hydrogen cyanide, and so forth. Such compounds are normally found in the waste water produced in standard acrylonitrile synthesis. In fact, the present method has been found to be extremely effective in treating wastes of very high organic nitrogen content, such as in excess of about 300 total Kjeldahl nitrogen (TKN). In fact, the present method is even very effective in degrading organic nitrogen compounds present in concentrations above about 500 TKN, such as above 800 or 1,000, and as high as 1,100 TKN or more. This invention will be capable of treating waste streams containing TKN values up to the point that the ammonia produced by microbial ammonification contains a high fraction of ionized ammonia, due to the low pH maintained by this invention, and free ammonia levels are below known acceptable toxicity limits for microorganisms.

The treatment process may be run at continuous flow and may accommodate flow rates of, example, about 1.6 to about 6.8 kg $COD/m^3$ bed/day and thus even in excess of about 5 kg $COD/m^3$ bed/day. According to the method, the stream is oxygenated, such as by means of an oxygen contactor chamber using pure or highly enriched oxygen, and then the highly oxygenated (dissolved oxygen) liquid is fed to the fluidized bed of the FBR, where aerobic microbial degradation occurs. This oxygenation might take place in the influent stream, but preferably takes place in the recycle line. Again, it should be noted that because oxygenation of the liquid occurs outside the fluidized bed and main column, the fluidized bed and main column are not aerated or sparged with gas. As a result, carbon dioxide produced by microbial respiration in the microbial degradation of the organic nitrogen compounds is not stripped out as in conventional technologies such as the activated sludge techniques of Kato et al. and the continuously aerated fixed film reactors of Knowles. Accordingly, the carbon dioxide may accumulate to extremely high levels, even to the point of effervescence when the feed contains high levels of degradable organics.

The effluent from the fluidized bed therefore is highly carbonated, providing substantial buffering of the effluent according to the reaction $CO_2+H_2O \leftrightarrows HCO_3^-+H^+$. Thus, instead of removal of carbon dioxide, forcing this reaction to the left and increasing the pH as in the prior art methods, the increase in carbon dioxide in the new method forces the reaction to the right, decreasing pH in mitigation of the pH increasing tendency of the high ammonia content. As a result, the toxic ammonia is converted to the relatively nontoxic ammonium ion and so it is possible to accommodate higher ammonia levels without high toxicity. This new method avoids undesirably high pH and maintains neutral pH without additional steps or additives.

The lowering of the pH resulting from high levels of carbon dioxide in FBRs is beneficial for maintaining neutral pH in applications (such as from about 6 to about 8, preferably about 6.7 to about 7.2, more preferably about 6.7 to about 7.1, especially about 6.8 to about 7) where the pH of liquid wastes would normally increase as a result of microbial degradation of chemicals, such as the microbial degradation of organic acids.

Because of the efficacy of the FBR and the ability to accommodate greater levels of ammonia production, greater chemical degradation than achieved by prior art techniques is possible. In fact, it has been found that while the Kato et al. and Knowles techniques were reported to produce removal efficiencies of about 71% to about 75%, respectively, of acrylonitrile bottoms in terms of the reduction of chemical oxygen demand (COD), the present method has been found to decrease the chemical oxygen demand of the treated liquid by more than 80%, generally by more than about 90%, especially by more than about 95%, and even by more than about 97%, such as by more than about 98%. In other words, the present method has been found to produce nearly complete chemical degradation of the organics in the feed.

The resulting effluent of high dissolved ammonia concentration (in the form of the ammonium ion) may then be routed for ammonia removal downstream. The removal may be carried out by any of many standard mechanisms such as an ammonia stripper. Because the ammonia is neutralized by the carbon dioxide to carbonate buffering mechanism rather than by addition of phosphoric acid or the like, ammonia stripping is simple and straight forward. The effluent does not contain high levels of exogenous acid to control pH that would interfere with ammonia stripping and so the carbon dioxide may be readily removed, thereby raising the pH of the effluent, and facilitating the ammonia stripping. Thus, complex, capital intensive, and expensive biological nitrification and denitrification as described in the Jeris patent are unnecessary. The absence of exogenous acid also facilitates recycling of water.

Accordingly, the organic nitrogen compounds in the waste stream are nearly completely degraded by the method of this invention, resulting in a treated waste stream nearly free of such compounds. The degradation is so nearly complete that the COD reduction is greater than 80%, typically greater than about 90% or even 95%. In fact, COD reduction in excess of about 97% or 98% has been achieved. Similarly, toxicity reduction has been found to be substantial as well. Thus, whereas the influent waste water may be extremely toxic (for example, it may have a 48 hr $EC_{50}$ for *Ceriodaphnia dubia* well below the toxic level of 50%, normally less than a percent, even less than a tenth of a percent), the effluent is relatively nontoxic. In fact, the 48 hr $EC_{50}$ for *Ceriodaphnia dubia* of the effluent stream may be over one hundred times higher, often more than even five hundred times higher than that of the influent stream. Thus, the 48 hr $EC_{50}$ for *Ceriodaphnia dubia* of the effluent stream is well above 50%, such as more than 70% and even may be greater than about 80%.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

In preparation for start-up, non-chlorinated water (20 L) was added to the main column of a laboratory scale FBR followed by addition of granulated activated carbon (approximately 2.8 kg) to a settled bed depth of 0.6 meters. In the fluidized bed process, water was passed upward through the carbon bed at a velocity sufficient to expand the bed beyond the point at which the frictional drag was equal to the net downward force exerted by gravity. In the lab-scale FBR, the bed was fluidized at a recycle flow rate of 1.0–1.2 gpm, to give an upflow velocity of 46–55 cm/min and a hydraulic recycling rate of 466–560 / min/m². This produced fluidization of the carbon bed to a height of 0.9 m (50% bed expansion). The volume of the carbon bed was 7.2 liters.

In order to concentrate chemicals on the GAC to sufficient concentration to promote microbial growth, a carbon adsorption phase preceded microbial inoculation of the carbon support matrix. Acrylonitrile (AN) wastewater (i.e., raw AN stripper bottoms) was pumped into the fluidized bed at a rate of 1 ml/min (1.6 kg COD/m³ bed/day) for two weeks. Typical raw AN stripper bottoms waste was reported to have approximately the following composition.

| Characteristic | Concentration (mg/l) |
| --- | --- |
| Succinonitrile | 1,800 |
| Fumaronitrile | 370 |
| Acrylonitrile | 3.5 |
| Maleonitrile | 110 |
| Unidentified nitrile | 160 |
| 3-Cyanopyridine | 75 |
| Cyanopropionaldehyde | 200 |
| Acetic Acid | 2,400 |
| Acrylic Acid | 2,800 |

Four 55-gallon drums of waste used in this study were each analyzed for nitrile content, COD, total organic carbon (TOC), ammonia levels ($NH_3$), total Kjeldahl nitrogen (TKN), and total suspended solids (TSS). These values were as follows:

| Characteristic | Concentration (mg/l) |
| --- | --- |
| COD | 8,000–10,500 |
| TOC | 2,700–3,500 |
| TKN | 800–1,100 or more |
| $NH_3$ | 100 |
| TSS | 20 |

The raw waste had a pH of about 5.2 and during start-up was adjusted to pH 7.0. Since the raw feed contained sufficient nitrogen and trace elements to support microbial growth, no additional supplements were added to the wastewater feed.

Once the pre,adsorption of GAC was complete, the microbial inoculum was added to the top of the reactor column and oxygenation was initiated. The microbial inoculation was carried out with inoculum that was a mixed microbial population from secondary return sludge from an activated sludge system from a waste treatment plant of an AN producer, and sludge from the activated sludge systems at two other industrial waste treatment plants. Sludge samples were homogenized by low-speed mixing in a blender before addition to the FBR column to prevent clumping of the biomass and to promote better adherence of the sludge to the carbon support. The GAC bed was inoculated with activated sludge (1 l) and the sludge was allowed to recirculate for 24 hours prior to start-up of continuous influent feed. The FBR was 'batch' fed for one week by adding AN wastewater (0.5 l) to the reactor. The batch quantity of feed served as an additional food supply for the microbial inoculum as the biomass acclimated to the FBR. After one week of batch feeding, the FBR effluent was clear of recirculating solids (unattached inoculum) and significant levels of oxygen uptake were detected. At this point, a continuous feed of AN wastewater to the FBR was begun at a flow rate of 1 ml/min.

Oxygen was withheld from the reactor during the pre-adsorption phase in order to limit possible chemical oxidation of feed components. Adsorption of wastestream chemicals onto the carbon support served as a concentrated food source to promote microbial attachment and growth on the carbon during the initial start-up phase after microbial inoculation. Also, pre-adsorbing chemicals to the active sites on the GAC would increase the probability that disappearance of specific carbon-adsorbable wastestream components alter in the study was due to microbial degradation, rather than selective carbon adsorption of the compounds. Once the effluent consistently showed a COD value of (100 mg/l), the pre-adsorption phase was terminated.

EXAMPLE 2

An experiment was carried out to determine the maximum capacity of a system by determining the point of overload. Influent feed for the lab-scale FBR prepared in accordance the procedure of Example 1, above, was raw AN stripper bottoms wastewater as described in Example 1, above. The effluent from the FBR was tested each day for COD breakthrough.

The influent feed was pumped into the recycle flow and pure oxygen was metered into the recycle stream using a mass flow controller (Model VCD 1000, Porter Instrument Co., St. Louis, Mo.). The recycle stream then flowed to the FBR oxygenation column and was thoroughly mixed. The total oxygenated recycle water (wastewater feed plus recycle water) exited the oxygen contact column and flowed into the bottom of the reactor column. Dissolved oxygen (DO) probes were used to detect levels of oxygen both at the influent flow (base of carbon bed) and at the recycle port (top of the reactor carbon) in order to measure oxygen use in the FBR and help in the control of DO at the desired levels. Dissolved oxygen levels in the FBR headspace were maintained at 2–4 mg $O_2$/l throughout the study.

The carbon biocarrier provided a vast and irregular surface which promoted microbial attachment and growth, resulting in an increase in height of the fluidized bed. Once the fluidized bed had grown to the desired expansion level (20% above initial fluidization height), it was necessary to control the biofilm thickness on the carbon particle to prevent the density of the bioparticle from decreasing to the point where bed carry-over through the effluent port occurred. This was accomplished by a biomass clipping device (BCD) which controlled bed expansion. When the bed depth exceeded 1.1 m the BCD was turned on to shear excess biomass from the GAC and hold the bed depth at this level.

Operational parameters were measured throughout the lab-scale FBR study. The data collected in the normal sampling regime included recycle flow rate (gpm), pH, influent feed rate (ml/min), bed height (includes fluidized), effluent quality, and DO (mg/l) at both the influent and recycle ports on the FBR. Oxygen uptake was determined by the differential concentration of DO between the bottom of the FBR and recycled water leaving the main column.

The initial AN wastewater flow rate to the reactor was 1 ml/min during the start-up phase. After a 7 day acclimation period, the influent flow rate was increased to 1.5 ml/min and held for another 7 days. This flow rate corresponded to the chemical loading level of 3.0 kg COD/$m^3$ bed/day based upon an average COD of 10,500 mg/l for the raw waste. The chemical load to the system was increased to 6.1 kg COD/$m^3$ bed/day (3 ml/min), and was held for 3 days. A third step-change in flow rate to 6 ml/min gave a chemical loading rate of 12.2 kg COD/$m^3$ bed/day. This influent flow rate was held for 6 days before the last step-change occurred. The final chemical loading rate to the FBR was 16.0 kg COD/$m^3$ bed/day and was delivered to the reactor by addition of (8 ml/min) of AN wastewater.

Effluent samples discharged from the FBR were taken from the effluent port at a minimum of three times each week for COD analysis. The influent feed to the FBR was analyzed for COD each time a new feed tank was used. Samples were filtered through a 0.45 μm filter and analyzed using an EPA approved analytical method for measuring the amount of organic matter in the water. Colorimetric determination of COD was performed with a commercial HACH test kit (HACH Analytical Methods Company, Loveland, Colo.). Effluent samples for TOC analysis were also collected three times each week.

Effluent from the FBR was collected at least twice each week, and at each flow rate change, for determination of ammonia content ($NH_3$—N) and total Kjeldahl nitrogen (TKN). A sample (150 ml) was filtered 0.45 μm and stored at 4° C. until shipped to a laboratory for analysis.

Biomass growing on the carbon support matrix expanded the carbon particle diameter as the influent chemical loading was increased. Excess biomass that detached from the GAC or was stripped off the BCD floated out of the main FBR column into the sludge collection trap. In addition, small particles of biomass that remained suspended in the water passed out of the system through the effluent port.

Effluent samples were taken for nitrile and acid analysis at a minimum of twice each week, and at each chemical loading rate change. Each analysis consisted of duplicate filtered (0.45 μm) effluent samples (40 ml each) placed in glass vials and stored at 4° C. The samples were analyzed by the methods described above for the AN process wastewater.

Since carbon adsorption is a mechanism for removal of chemicals from AN wastewater treated using an FBR, organic chemical residues on the GAC were measured. These data were needed to show that microbial degradation was the primary chemical removal mechanism in the FBR. Nitrile residues on carbon samples from the support bed were taken during the pre-adsorption phase of the start-up for the second FBR study. Subsequent to the microbial inoculation of the carbon bed, carbon samples (20 ml) were taken during each of the four chemical loading phases. The carbon samples were extracted by weighing two grams of the carbon samples into an extraction thimble. Sodium sulfate (10g) was added to the carbon and the sample was thoroughly mixed. Samples were then continuously extracted for 14 hours using methylene chloride in a soxhlet extraction apparatus. Nitrile compounds in extracts were characterized by GC/MS using analytical methods described above for analysis of influent and effluent water. The limit of detection was (5 μg nitrile/g carbon).

The gas emitted from the top of the reactor column was monitored during steady-state performance of the FBR. Samples were collected over a 10 hour time period by trapping the gas in a summa vessel. After collection of the samples, the ammonia concentration was determined using a Corning Model 250 pH meter with a Corning Ammonia combination electrode.

The measurement of COD and TOC began 5 days after the inoculation of the carbon biocarrier. The chemical loading and COD removal efficiency found is shown in FIG. 1. The COD of the FBR effluent was below 5 mg/l during the microbial acclimation period. Measurement of effluent TOC during the 12-day acclimation period showed a greater than 99% efficiency of TOC removal. At the design loading rate of 6.2 kg COD/$m^3$ bed/day (3 ml/min influent flow), the reactor had a COD and TOC removal efficiency of 99%. The COD loading rate to the reactor was doubled at day 16 to 12.5 kg COD/$m^3$ bed/day. The loading increase was followed by an increase in the effluent COD to (100 mg/l) and after 3 days the effluent COD was (290 mg/l) and TOC was (100 mg/l), representing a 97% rate of COD and TOC removal. The reactor was able to tolerate a 2-fold loading increase above design loading rate.

To further determine the maximum sustainable loading rate to the FBR, and the simulate 'surge-load' conditions for influent flow rate, the COD loading to the reactor was increased to 16.0 kg COD/$m^3$ bed/day on day 21. The FBR responded to the maximum loading rate by an immediate downturn in removal efficiency. The COD levels in the FBR effluent increased sharply over a 4-day period. Removal efficiency for COD decreased to 58% by day 25 showing that the FBR was not able to withstand the 16.0 kg COD/m$^3$ bed/day loading rate. When the loading rates were increased during the study to the point that the FBR failed to treat the influent waste, the immobilized bacteria were not oxygen limited since the DO at the effluent port remained at the 2–4 mg/l level. However, the DO differential did decrease to 2 mg/l, which suggests that the higher chemical concentrations may have resulted in some toxicity to chemical-degrading bacteria in the FBR resulting in lower oxygen utilization.

During the trials, microbial destruction of the carbonaceous constituents of the AN stripper bottoms waste produced high levels of carbon dioxide in the FBR, causing effervescence of gas from the column. The presence of carbon dioxide concentrations above saturation levels in the reactor provided carbonate buffering in the system. This buffering served to limit changes in the pH of the FBR. The pH of the reactor ranged from 6.7–6.9 during normal operations of the FBR treatability study, and no external adjustments of pH was necessary.

Evidence of microbial biodegradation was seen by a constant DO differential of 3–4 mg/l between the bottom of the bed and the liquid headspace at the top of the FBR. The amount of oxygen delivered to the FBR was carefully metered to achieve a 2–4 mg/l level of DO in the reactor headspace.

This study showed that FBR technology was feasible for carbonaceous removal from raw AN stripper bottoms waste. This study demonstrated that an FBR could produce high effluent quality (greater than 97% removal of COD/TOC) at a chemical loading rate of 6.3 kg COD/m$^3$ bed/day. Furthermore, when COD loading to the FBR was increased to 12.5 kg COD/m$^3$ bed/day, efficiency of chemical removal started to decrease, and the system failed to tolerate the maximum loading rate of 16.0 kg COD/m$^3$ bed/day. Based on these data, a design chemical loading of about 5 kg COD/m$^3$ bed/day was chosen for the FBR treating AN wastewater.

EXAMPLE 3

This study evaluated the long-term operation and performance stability of the FBR for treating AN wastewater. A lab-scale FBR was prepared in accordance with the procedure of Example 1, above, except that a mixed microbial population from only one of the activated sludges used in the pre-adsorption was used as inoculum. The general procedures of Example 2 were repeated except as follows.

This FBR study began by acclimating the reactor to a 1.6 kg COD/m$^3$ bed/day (1 ml/min) influent flow for 10 days. The average COD for the raw AN wastewater in this study was 8,000 mg/l. After the acclimation period, the chemical load to the system was increased to 3.2 kg COD/m$^3$ bed/day (2 ml/min). This chemical loading rate was maintained for 20 days before the influent flow rate was increased to 5.0 kg COD/m$^3$ bed/day (3 ml/min). When the 5.0 kg COD/m$^3$ bed/day loading rate had been maintained for 16 days, representing 9.5 hydraulic resident times (HRTs), the influent flow was increased to the maximum rate of 6.8 kg COD/m$^3$ bed/day (4 ml/min). After 15 days of reactor operation at that flow rate (representing 12 HRTs), the chemical loading rate was decreased to 4.8 kg COD/m$^3$ bed/day and remained at this loading rate for the remainder of the study.

Measurements as identified in Example 2, above, were carried out. Biomass measurements also were determined in this study from carbon samples taken at the top and the bottom of the carbon support bed. Measurements for biomass attached to the GAC were made using a gravimetric/heat volatilization method. Biomass measurements were used to determine total biomass present during each chemical loading rate.

The FBR was run at steady-state operation an additional 2 months (days 62–125). At completion of this FBR study, end-point samples of the effluent were analyzed by gas chromatography/mass spectroscopy (GC/MS), electrospray MS, and capillary zone electrophoresis (CZE) for identification of the organic compound(s) present in the effluent.

Samples of the raw AN wastewater and a composite end-of-study effluent sample from the study were assessed for acute toxicity during a 48 hour exposure period. *Ceriodaphnia dubia* was used for the toxicity analysis. The 48 hr $EC_{50}$ of the raw waste was 0,093%. The 48 hr $EC_{50}$ of the effluent was 80.7%. Both tests were evaluated at a 95% confidence level. These results indicate that an 867-fold reduction in toxicity was achieved with FBR biotreatment of the AN wastewater.

Figure 2:
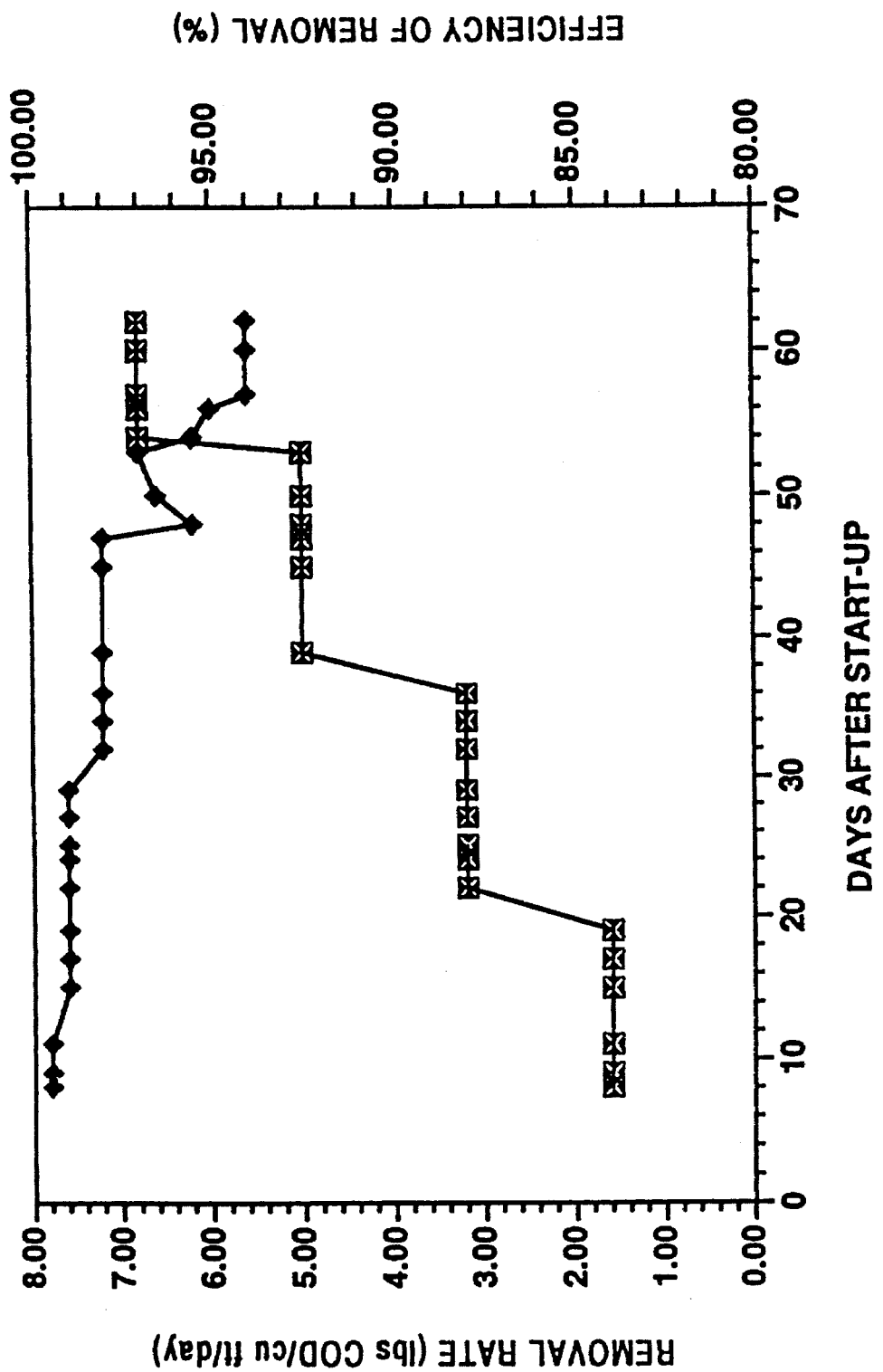
FIG. 2 is a graph of the chemical loading (represented by squares) and COD removal efficiency (represented by diamonds) for the fluidized bed reactor of Example 3.

A graphical presentation of chemical loading (COD) and removal efficiency is shown in FIG. 2. The concentrations of COD and TOC in the FBR effluent at the time of start-up were 100 mg/l and 57 mg/l, respectively. Initial COD and TOC levels were present due to the pre-adsorption phase before the carbon support was inoculated with microorganisms. During the 18-day acclimation period, the COD of the effluent remained below 80 mg/l and TOC was low (less than 20 mg/l ). This represented a removal efficiency of 99% during the reactor start-up period. At day 18 the loading rate was increased to 3.2 kg COD/m$^3$ bed/day (60 hrs HRT). On day 32 the COD in the reactor effluent had increased to 115 mg/l with a TOC of 28 mg/l This correspondence to a COD and TOC removal efficiency of 98.5%. The influent flow to the FBR was held at design loading rate of 5.0 kg COD/m$^3$ bed/day for 2.5 weeks and the maximum level of COD in the FBR effluent was measured at 125 mg/l, with a maximum TOC level of 85 mg/l. During the design loading phase of this treatability study, COD and TOC efficiency was 97%.

The FBR received a temporary 'shock-load' (for approximately 18 hours) of 12.5 kg COD/m$^3$ bed/day on Day 47. This was caused by switching to a new drum of stripper bottoms waste containing a high COD lead (21,000 mg/l ) as influent feed. The COD of the FBR effluent increased to 305 mg/l and TOC was 171 mg/l immediately after the shock-load. The FBR was flushed with clean water (8 l) to remove the extra carbonaceous load and feed to the reactor was shut off for 2 days to allow the biomass to recover from the shock-load. The new feed was diluted with water to a concentration of 8,000–9,000 mg/l of COD, which is representative of the normal concentration of AN stripper bottoms waste. Continuous feeding to the reactor was resumed on day 50 (three days after the shock load) at the design loading rate and the removal efficiency in the FBR increased to greater than 97%. After operating for 4 days at the design loading rate, the feed load was increased to 6.7 kg COD/m$^3$ bed/day. The removal efficiency for both COD and TOC leveled off at 94%. This demonstrated good tolerance and recovery by the system.

Evidence of microbial biodegradation was seen by a constant DO differential of 3–4 mg/l between the bottom of the bed and the liquid headspace at the top of the FBR. The amount of oxygen delivered to the FBR was carefully metered to achieve a 2–4 mg/l level of DO in the reactor headspace.

Biological destruction of the nitrile components of the AN stripper bottoms waste produced ammonia as a by-product. The total Kjeldahl nitrogen (TKN) and ammonia nitrogen content of the FBR effluent during the study were monitored and the results were as follows:

| Days | Chemical Loading (kg COD/m³ bed/day) | HRT (hr) | TKN (mg/l) | $NH_3$—N (mg/l) |
|---|---|---|---|---|
| 1 | 1.6 | 120 | 64 | 45 |
| 7 | 1.6 | 120 | 463 | 432 |
| 11 | 1.6 | 120 | 511 | 418 |
| 18 | 3.2 | 60 | 546 | 546 |
| 21 | 3.2 | 60 | 527 | 588 |
| 24 | 3.2 | 60 | 637 | 555 |
| 25 | 3.2 | 60 | 665 | 672 |
| 32 | 5.0 | 40 | 648 | 672 |
| 38 | 5.0 | 40 | 675 | 666 |
| 43 | 5.0 | 40 | 746 | 751 |
| 49 | 5.0 | 40 | 814[1] | 797 |
| 50 | 5.0 | 40 | 480 | 477 |
| 54 | 6.8 | 30 | 434 | 424 |
| 58 | 6.8 | 30 | 492 | 483 |
| 62 | 6.8 | 30 | 582 | 553 |
| 68 | 6.8 | 30 | 619 | 606 |
| 69 | 6.8 | 30 | 561 | 562 |

[1]A surge-load of chemical occurred on day 47 causing elevated TKN and ammonia levels in the effluent.

The TKN of the raw waste used for the first 50 days of the feasibility study was 1,100 mg/l, and the ammonia nitrogen content was 65 mg/l. The TKN of the influent feed for days 51–70 of the study was 800 mg/l. The level of $NH_3$—N in the FBR steadily increased to a maximum concentration of 797 mg/l on day 49. The chemical shock-load that occurred at day 47 elevated the $NH_3$—N content in the effluent. The 40% decrease in effluent $NH_3$—N concentration (day 50) after the shock-load was attributed to flushing of the FBR with clean water to remove potential toxic loads of waste constituents that had entered the system during the chemical shock. After influent COD loading to the reactor was re-established on day 50 at a 5.0 kg COD/m³ bed/day, the NH3—N effluent levels increased to a maximum of 606 mg/l by the end of the study. Comparison of the concentrations of TKN and $NH_3$—N in the FBR effluent showed that more than 98% of the TKN of the raw waste was converted to $NH_3$—N. The effluent was monitored for levels of nitrate/ nitrite and none were found above levels of detection. This indicates that no nitrification was occurring in the reactor. High COD and TOC removal efficiencies were obtained in the presence of $NH_3$—N levels ranging from 424 to 797 mg/l. Analysis of the reactor off-gas revealed 0.108 mg $NH_3$ of off-gas during steady-state operation. Based on this data, stripping of $NH_3$ from the reactor by off-gas was not a significant mechanism for removal of $NH_3$—N.

Biomass measurements were made several times at each chemical loading setpoint during the study. Biomass on the carbon support matrix increased in response to each increase in COD loading as shown in the following table:

| Days | Chemical Loading (kg COD/ m³bed/day) | HRT (hr) | Biomass (mg/l) |
|---|---|---|---|
| 18 | 1.6 | 120 | 16,000 |
| 32 | 3.2 | 60 | 23,000 |
| 47 | 5.0 | 40 | 33,500 |
| 62 | 6.8 | 30 | 47,000 |

One of the main advantages noted in the use of an FBR system to treat AN wastewater was the ability of the GAC to support large quantities of attached biomass. This resulted in an increase in biomass levels in the reactor in response to each increase in chemical loading.

The FBR containing GAC had the potential to adsorb nitrile and pyridine compounds in order to promote microbial degradation to ammonia. However, the adsorptive capacity was low, as determined by reported specific carbon adsorption isotherms for these compounds. Mass balance analysis for the major organic constituents in the AN waste required the periodic analysis of the carbon to determine if removal of the organics from the effluent was due to selective removal by adsorption onto the GAC.

The results of extracting samples of the carbon bed for the determination of adsorbed concentrations of succinonitrile, fumaronitrile, and 3-cyanopyridine are shown in the following table:

| Days After Start-Up | Succinonitrile | Fumaronitrile | Cyanopyridine |
|---|---|---|---|
| Control | 0 | 0 | 0 |
| Pre-adsorption | 278 | 61 | 127 |
| 17 | ND[2] | 5 | 117 |
| 23 | ND | ND | 149 |
| 37 | ND | 26 | 254 |
| 45 | ND | 14 | 139 |
| 64 | ND | 8 | 178 |

[1]Concentration values are ug compound/g carbon. Estimated limit of detection is 5 ug/g.
[2]ND = not detected.

Pre-adsorbing the carbon with AN wastewater prior to microbial inoculation allowed for low-levels of the nitriles and 3-cyanopyridine to accumulate on the GAC. However, within about 2.5 weeks after microbial inoculation, no detectable quantities of succinonitrile were present on the carbon indicating that the initial 578 μg/g of succinonitrile present on GAC at reactor start-up was removed. Similarly, other nitrile compounds were found not to accumulate of the GAC.

The mass of GAC in the FBR and the chemical loading of 3-cyanopyridine can be used to calculate the expected residues on the GAC if chemical adsorption were the sole route of removal for 3-cyanopyridine. For example, the FBR contained approximately 2,800 grams of GAC and the concentration of 3-cyanopyridine on the carbon support at day 64 was (178 μg/g carbon). Therefore, a total of 498 mg of 3-cyanopyridine was adsorbed onto the bed 64 days after start-up. Since the concentration of 3-cyanopyridine in the AN stripper bottoms waste was 75 mg/l, a total of 15 grams of the chemical had been loaded into the reactor by day 64. Adsorption onto the GAC accounted for removal of only 3.4% of the total mass of 3-cyanopyridine added to the reactor. The non-accumulation of chemicals adsorbed to GAC in the FBR indicate that microbial degradation was responsible for removal of nitriles and 3-cyanopyridine from AN wastewater.

Effluent samples were analyzed for nitriles and 3-cyanopyridine during the study, in order to study reactor performance in greater detail than was possible by only examining the COD and TOC of the effluent. These specific chemical analyses were performed several times at each chemical loading rate with the following results:

| Days After Start-up | Chemical[1] Loading | Succin- onitrile | Fumaroni- trile | Acrylon itrile | 3-Cyano- pyridine |
|---|---|---|---|---|---|
| 1 | 1.6 | 4.1 | ND | ND | ND |
| 2 | 1.6 | 4.7 | ND | ND | ND |
| 6 | 1.6 | ND | ND | ND | ND |
| 17 | 1.6 | ND | ND | ND | ND |
| 20 | 3.2 | ND | ND | ND | ND |
| 23 | 3.2 | ND | ND | ND | ND |
| 24 | 3.2 | ND | ND | ND | ND |
| 31 | 3.2 | ND | ND | ND | ND |
| 37 | 5.0 | ND | ND | ND | ND |
| 45 | 5.0 | ND | ND | ND | ND |
| 50 | 5.0 | ND | ND | ND | ND |
| 52 | 5.0 | ND | ND | ND | ND |
| 56 | 6.8 | ND | ND | ND | ND |
| 62 | 6.8 | ND | ND | ND | ND |
| 69 | 6.8 | ND | ND | ND | ND |
| 71 | 6.8 | ND | ND | ND | ND |

[1]Succinonitrile, fumaronitrile and 3-cyanopyridine concentrations are reported in mg/L, with a limit of detection of 1 mg/L. Acrylonitrile concentrations are reported in ug/L, with a limit of detection of 100 ug/L.
[2]Chemical loading rates are reported as kg COD $M^{-3}$ bed day$^{-1}$.

The theoretical accumulation of individual nitrile components in the FBR was determined by calculating the concentration of chemical flowing into the reactor minus the concentration of chemical flowing out of the reactor.

Assuming no biodegradation or carbon adsorption was occurring, the expected concentration of nitriles and 3-cyanopyridine present in the effluent at day 17 would be: 1,278 mg/L succinonitrile, 2.49 mg/L acrylonitrile, 262 mg/L fumaronitrile, 53 mg/L 3-cyanopyridine. However, analysis of the FBR effluent during the acclimation period revealed no nitriles or 3-cyanopyridine present. Similarly, when the FBR was at steady-state equilibrium after 45 days of operation, assuming no biodegradation or carbon adsorption was occurring, the concentration of succinonitrile, fumaronitrile, acrylonitrile, and 3-cyanopyridine in the effluent would be expected to equal the concentration in the raw AN waste. However, analysis of the effluent at the 3.2, 5.0 (steady-state loading), and 6.7 kg COD/$m^3$ bed/day loading rates showed no detectable levels of these compounds. Since nitriles and 3-cyanopyridine were not accumulating on the GAC during the study, chemical adsorption onto GAC was not responsible for removal of these compounds from the treated wastes. These data indicate that rapid acclimation of the biomass to the influent feed and subsequent biodegradation of the organic constituents accounted for the removal of nitriles and 3-cyanopyridine from the effluent during initial start-up of the reactor.

The FBR produced stable COD and TOC removal efficiencies ranging from 99% (1.6 kg COD/$m^3$ bed/day) to 94% (6.7 kg COD/$m^3$ bed/day). This study showed that more than 97% of the COD and TOC of the wastewater could be removed consistently during steady-state operation of the reactor at a chemical loading rate of 5.0 kg COD/$m^3$ bed/day.

Chemical analysis of the raw AN stripper bottoms waste and the FBR effluent provided data to support mass balance analyses for the 3-cyanopyridine and nitrile components of the wastewater. Specific degradation of succinonitrile and fumaronitrile occurred at greater than 99% efficiency, and removal efficiencies of 97% were shown for acrylonitrile and 3-cyanopyridine. No detectable concentrations of acrylonitrile were found in effluent samples taken throughout this study. These results indicate both rapid acclimation of the biomass to the nitriles and the ability to biodegrade excess nitriles reliably during surge loadings.

Biodegradation of AN wastewater containing high levels of nitriles produced concentrations of ammonia ranging from 400 to 800 mg/l. Levels of ammonia above 300 mg/l can have severe toxic effects on the catabolic activities of microorganisms. The toxicity of aqueous ammonia depends primarily on the pH of the water since only the un-ionized molecule ($NH_3$ as opposed to $NH_4+$) is toxic. At a pH of 7.0 or less, microbes can tolerate high levels of total ammonia since most is present as $NH_4+$. The FBR maintained a stable pH of 6.7–6.8 due to the large biogeneration of carbon dioxide from biodegradation of the stripper bottoms waste. The utilization of carbonate buffering in the FBR to maintain a neutral pH resulted in a much greater tolerance of the microorganisms to the high levels of ammonia that accumulated in the reactor. The steady increase in the ammonia concentration in the reactor over the 50 days of the study did not effect chemical removal efficiencies. These results show outstanding performance of the FBR for treating wastewaters containing high levels of organic nitrogen.

The GAC used in the FBR provided a vast surface area for biological growth, and contributed to the ability of the reactor to sustain high biomass levels ranging from up to 47,000 mg/l. These biomass concentrations were five to ten fold higher than can be achieved in conventional activated sludge systems (CASS). The stable retention of high biomass levels in the FBR is the primary reason that high COD removal efficiencies could be obtained.

The use of a FBR for biotreating AN stripper bottoms waste in this study resulted in a performance level which was significantly better than shown previously with CASS or microbial systems bioaugmented with specific organisms adapted to the individual chemicals of the AN wastes.

In view of the above, it will be seen that the several advantages of the invention are achieved and other advantageous results attained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A method for treatment of a liquid waste stream having an undesirably high COD and comprising water and a concentration of organic nitrogen compounds of at least about 300 mg/l total kjeldahl nitrogen, the organic nitrogen compounds including nitriles, the method comprising:

(a) directing the liquid waste stream as part of a feed through a fluidized bed of organic nitrogen compound-adsorbent particulate solids supporting microorganisms capable of biodegrading the organic nitrogen compounds, thereby to expose the feed to the microorganisms and to produce a treated liquid, a portion of which is directed as a recycle stream back through the fluidized bed and another portion of which exits the fluidized bed as a treated effluent comprising water, ammonia and carbon dioxide, the feed comprising the recycle stream in combination with the liquid waste stream that is directed through the fluidized bed; and (b) oxygenating at least one of the feed and the recycle stream to add thereto dissolved oxygen;

thereby to subject the organic nitrogen compounds to aerobic microbial degradation and to maintain the treated liquid at a pH in the range of from about 6 to about 8.

2. A method as set forth in claim 1 wherein the pH of the treated liquid is maintained in the range of from about 6 to about 8 by allowing carbon dioxide in the treated liquid to react with water in the treated liquid, thereby to effect carbonate buffering of the treated liquid.

3. A method as set forth in claim 2 wherein the carbon dioxide effects self-buffering to maintain said pH in the range of from about 6 to about 8 and no additional buffering agent is added to the treated liquid.

4. A method as set forth in claim 3 wherein the said pH is maintained by means of the carbonate buffering in a range of from about 6.7 to about 7.1.

5. A method as set forth in claim 3 wherein the fluidized bed is not sparged with gas during the treatment of the waste stream.

6. A method as set forth in claim 5 wherein the carbonate buffering is effected entirely by the formation of carbon dioxide during the aerobic microbial degradation.

7. A method as set forth in claim 3 wherein the liquid waste stream is treated in a continuous flow process at a rate of at least about 5 kg COD/m$^3$ bed/day.

8. A method as set forth in claim 7 wherein the treatment reduces the COD of the liquid waste stream by at least about 80%.

9. A method as set forth in claim 8 wherein the treatment reduces the COD of the liquid waste stream by at least about 90%.

10. A method as set forth in claim 9 wherein the liquid waste stream has a 48 hr $EC_{50}$ for *Ceriodaphnia dubia* of less than about one percent and ammonia is removed from the effluent to produce a water stream having a 48 hr $EC_{50}$ for *Ceriodaphnia dubia* of at least about 50%.

11. A method as set forth in claim 9 wherein the liquid waste stream has a 48 hr $EC_{50}$ for *Ceriodaphnia dubia* of less than about one percent and the effluent is stripped of ammonia to produce a water stream having a 48 hr $EC_{50}$ for *Ceriodaphnia dubia* of at least about 70%.

12. A method as set forth in claim 3 wherein the liquid waste stream is treated in a continuous flow process at a rate of from about 1.6 to about 6.8 kg COD/m$^3$ bed/day.

13. A method as set forth in claim 1 wherein the nitriles comprise dinitriles.

14. A method as set forth in claim 13 wherein the particulate solids are nitrile-absorbent.

15. A method as set forth in claim 14 wherein the liquid waste stream is purge water from an acrylonitrile manufacturing plant.

16. A method as set forth in claim 15 wherein the purge water from an acrylonitrile manufacturing plant is acrylonitrile stripper bottoms or a stream derived therefrom.

17. A method as set forth in claim 14 wherein the particulate solids are granulated activated carbon.

18. A method as set forth in claim 1 wherein the liquid waste stream is treated in a continuous flow process at a rate of at least about 5 kg COD/m$^3$ bed/day.

19. A method as set forth in claim 18 wherein the treatment reduces the COD of the liquid waste stream by at least about 80%.

20. A method as set forth in claim 19 wherein the treatment reduces the COD of the liquid waste stream by at least about 90%.

21. A method as set forth in claim 1 wherein the liquid waste stream is treated in a continuous flow process at a rate of from about 1.6 to about 6.8 kg COD/m$^3$ bed/day.

22. A method as set forth in claim 1 wherein the treatment reduces the COD of the liquid waste stream by at least about 80%.

23. A method as set forth in claim 22 wherein the treatment reduces the COD of the liquid waste stream by at least about 90%.

24. A method as set forth in claim 23 wherein the treatment reduces the COD of the liquid waste stream by at least about 95%.

25. A method as set forth in claim 1 wherein the feed contains at least about 50 ppm by weight dinitriles.

26. A method as set forth in claim 25 wherein the feed has a concentration of organic nitrogen compounds of at least about 500 mg/l total kjeldahl nitrogen.

27. A method as set forth in claim 1, further comprising:

(c) venting the effluent to remove carbon dioxide;

(d) stripping the vented effluent to remove ammonia; and (e) recovering the resulting stream comprising water for further use.

28. A method as set forth in claim 27 wherein the ammonia removed from the vented effluent is recovered for further use.

29. A method for treatment of a liquid containing water and a concentration of organic nitrogen compounds of at least about 300 mg/l total kjeldahl nitrogen, including at least about 50 ppm by weight dinitriles, comprising passing the liquid through a fluidized bed reactor, the fluidized bed reactor including a recycle line and containing a fluidized bed of nitrile-adsorbent particulate solids supporting microorganisms capable of biodegrading the organic nitrogen compounds, by a process in which the liquid is oxygenated by dissolving oxygen in the feed to the fluidized bed reactor at a point external to the fluidized bed, thereby to subject the organic nitrogen compounds in the oxygenated liquid to aerobic microbial degradation and to produce an effluent containing water, ammonia and carbon dioxide.

30. A method as set forth in claim 29 wherein the pH of the liquid while it is in the fluidized bed and of the effluent is maintained in the range of from about 6 to about 8 by allowing the carbon dioxide in the liquid while it is in the fluidized bed and in the effluent to react with the water in the effluent, thereby to effect carbonate buffering.

31. A method as set forth in claim 30 wherein the particulate solids are granulated activated carbon.

32. A method as set forth in claim 29 wherein the liquid is treated in a continuous flow process at a rate of at least about 5 kg COD/m$^3$ bed/day.

33. A method as set forth in claim 32 wherein the treatment reduces the COD of the liquid waste stream by at least about 80%.

34. A method as set forth in claim 29 wherein exogenous acid is not added to the liquid or fluidized bed reactor for pH control, and further comprising stripping ammonia from the effluent.

35. A method as set forth in claim 29 wherein exogenous acid is not added to the liquid or fluidized bed reactor for pH control, and further comprising venting carbon dioxide from the effluent and then stripping ammonia from the effluent.

36. A method as set forth in claim 35 wherein after the ammonia is stripped, the effluent is recovered for further use as a water stream.

37. A method as set forth in claim 29, further comprising venting the effluent to remove carbon dioxide, stripping the vented effluent to remove ammonia and recovering the resulting stream comprising water for further use.

38. A method as set forth in claim 29, further comprising venting the effluent to remove carbon dioxide, stripping the vented effluent to remove ammonia to produce a stream consisting essentially of water.

39. A method as set forth in claim 38 wherein the ammonia removed from the vented effluent is recovered for further use.

* * * * *